Figure 1:
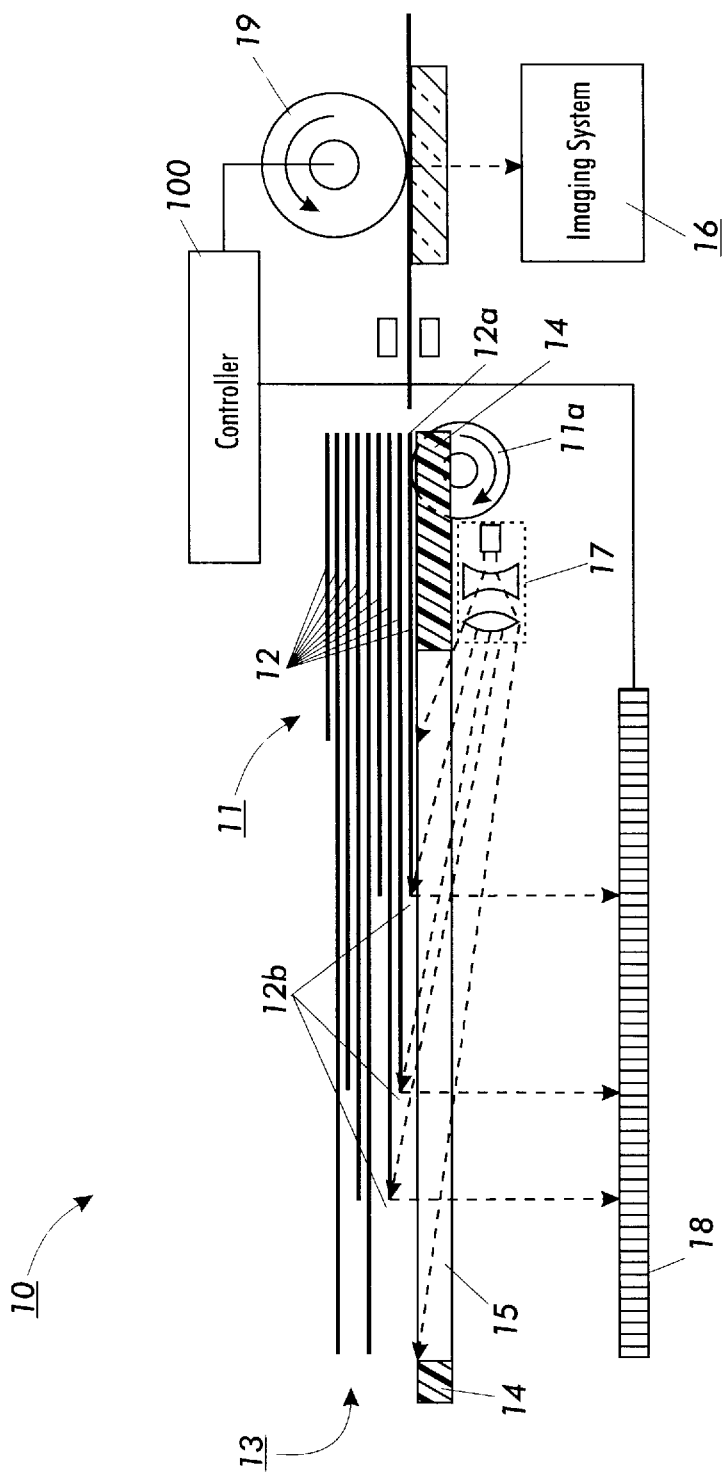

United States Patent

Acquaviva et al.

[11] Patent Number: 5,847,405
[45] Date of Patent: Dec. 8, 1998

[54] SIZE OR POSITION SENSING OF INTERMIXED SHEETS IN A SHEET STACKING TRAY WITH SHEET EDGE SHADOW DETECTION

[75] Inventors: Thomas Acquaviva, Penfield; Jan Bares, Webster, both of N.Y.

[73] Assignee: Xerox Corporation, Stamford, Conn.

[21] Appl. No.: 923,588

[22] Filed: Sep. 4, 1997

[51] Int. Cl.[6] ................................................. G01N 21/86
[52] U.S. Cl. .................................. 250/559.36; 250/223 R
[58] Field of Search .......................... 250/559.36, 223 R, 250/559.24, 559.25; 356/384, 385, 386

[56] References Cited

U.S. PATENT DOCUMENTS

| | | | |
|---|---|---|---|
| 4,417,148 | 11/1983 | Otake | 250/559.36 |
| 4,540,887 | 9/1985 | Minerd et al. | 250/561 |
| 4,691,100 | 9/1987 | Kizu et al. | 250/223 R |
| 5,521,692 | 5/1996 | Bares | 355/311 |

OTHER PUBLICATIONS

Xerox Disclosure Journal Publication vol. 21, No. 3, May/Jun. 1996, "Sensing Scheme to Detect Intermixed Size Sheets" by T. Acquaviva.

*Primary Examiner*—Edward P. Westin
*Assistant Examiner*—Kevin Pyo

[57] ABSTRACT

A non-contact optical sheet size and/or position detection system for detecting the position of at least one edge of an outside (top or bottom) document sheet stacked in a sheet stacking tray in which thin document sheets of different sizes and/or positions are stacked on top of one another; with an illumination source for illuminating the potential sheet edge areas at an angle generating detectable sheet edge shadows, and an optical detection system remotely detecting the edge shadow positions to provide sheet edge location information to a control system for the imaging or offsetting of the sheet. In a document feeder for sequentially feeding a top or bottom sheet to be imaged, the detection system may be responsive only to a moving sheet edge shadow to determine the size of the sheet being fed to be imaged relative to other sheets in the stack irrespective of intermixed different sizes of sheets in the stack. For a bottom feeder the detection may be through an elongate aperture in the tray. For an output stacking system with a system for offsetting alternately printed sets of sheets in a stacking tray the detected edge shadow(s) of the top sheet may be used to control the offsetting.

7 Claims, 3 Drawing Sheets

5,847,405

SIZE OR POSITION SENSING OF INTERMIXED SHEETS IN A SHEET STACKING TRAY WITH SHEET EDGE SHADOW DETECTION

Cross-reference is made to a contemporaneously filed application on sheet edge shadow sheet edge position detection in document feeder sheet stacks or reproduction machine output sheet stacks by this same co-inventor Thomas Acquaviva, and the same assignee, entitled "TRANSPARENCY SHEET EDGE DETECTOR SYSTEM USING EDGE SHADOW SENSING", application Ser. No. 08/923,587, Attorney Docket No. D/97392.

The embodiments disclose a system for the detection of the size and/or position of at least one edge of a sheet in a stack of sheets by a non-contacting optical detection system detecting the sheet edge shadow. This detected information may be variously utilized, although not limited thereto, for the detection of the size of a top or bottom sheet being fed by a document handler from a stack of intermixed sizes of document sheets, for control of the document handler and/or its associated imaging or printing system; and/or for detecting the offset position of the top sheet in an output stacking system for control of the proper offsetting of alternately printed stacks of sheets. It has been surprisingly found that even thin paper sheets directly underlaid or superposed by other sheets can, with an appropriate edge shadow formation illumination and edge shadow detection system, generate control signals indicative of the position of the sheet edge in the stack even in stacks of intermixed sheet sizes and positions.

The general use of reflective or transmitting optical detection systems for detecting the edge of a document sheet in a reproduction apparatus such as a copier, printer or scanner is well known. One general example is Xerox Corporation U.S. Pat. No. 4,540,887 issued Sep. 10, 1985 to T. M. Minerd, et al. Others are cited therein.

Further by way of background, a recent example of a document handling system with electronic measurement of the document size, and discussions of problems associated therewith and the need for that information in a document handler, are discussed in Xerox Corporation U.S. Pat. No. 5,596,399 issued Jan. 21, 1997 to N. J. Dempsey, et al, and other references cited therein. A mechanical contact document size sensing scheme for intermixed size document sheets in a document scanner or feeder is described in the Xerox Disclosure Journal Vol. 21, No. 3, May/June, 1996, pages 237–239 by the same Thomas Acquaviva.

Of particular interest, Xerox Corporation U.S. Pat. No. 5,521,692 issued May 28, 1996 to Jan Bares suggests identifying surface relief features of a substrate in a printing machine by apparatus including a very low, grazing angle light source illumination of the surface to receive signals of ridges and depressions in the substrate surface indicating surface relief features of the substrate.

The present system may be utilized with various different document handlers or feeders input trays and documents; and/or with various different output trays and offsetting systems, all of which are known from the above and various other references and products, and thus need not be described in detail herein.

Figure 3:
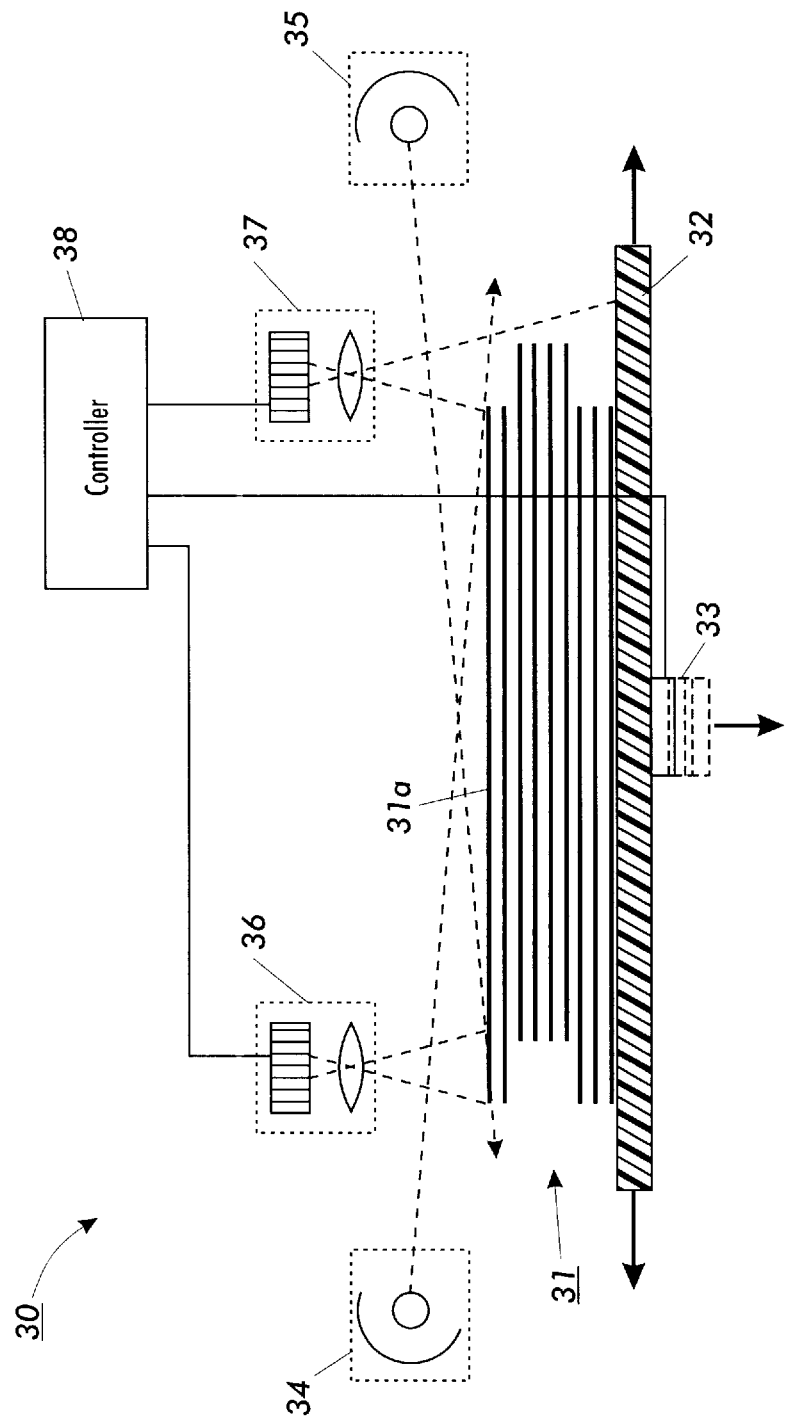

Further by way of background, the desired offsetting of respective sets of copy sheets in an output tray, either laterally or in the process direction, is well known, and is described, for example, in the various references cited in Cols. 1 and 2 of Xerox Corporation U.S. Pat. No. 5,639,080 issued Jun. 17, 1997 to J. B. Evans, as well as shown in FIG. 3 and elsewhere in said '080 patent.

As noted in connection with these and other references, e.g., the above-cited U.S. Pat. No. 5,596,399, the present system may also be combined, for example, with a document width detector in a document handler or other such devices for document dimension or position detection. That is, while the present system is described with regard to detection of the size and/or position of at least one edge of a sheet in the embodiments herein, it will be appreciated that other, e.g., orthogonal, edges of sheets may be detected either in the same manner or by various other known sheet edge detection systems which may be combined therewith. For example, in a document handler, typically the lead edge of a document is detected as it is fed downstream by occlusion by that moving sheet lead edge of a conventional lead edge detector near the entrance of the document handler, such as sensor 31 in said U.S. Pat. No. 5,596,399.

A particular difficulty with many of the prior art document edge or position detectors, however, is that they cannot detect the edge or position of a sheet on a stack of other sheets, particularly if the sheets in the stack are of different sizes or edge positions, as contrasted to an individual sheet already separated from the stack of sheets. In the present system, it has been found that by appropriately angled illumination and by appropriate detection that an edge shadow can be generated and detected even of the thin edges of paper sheets directly lying upon or under a stack of superposed sheets which extend beyond the sheet edge being detected.

A specific feature of the specific embodiments disclosed herein is to provide a non-contact optical sheet size or position detection system for a sheet stacking tray in which thin document sheets of different sizes or positions are stacked on top of one another; said sheet detection system detecting the position of at least one sheet edge of an outside (top or bottom) sheet of said stack, comprising an illumination source for illuminating for light reflection therefrom an area of the surface of said outside sheet of said stack, said illuminated area including at least said one sheet edge, said illumination from said illumination source being at a sufficiently shallow illumination angle to the surface of said outside sheet to generate a detectable edge shadow directly adjacent to said sheet edge, which edge shadow is relatively darker than reflected said illumination of said top sheet adjacent thereto, said illumination angle being substantially greater than a grazing angle to not form shadows from said surface of said sheet; and an optical detection system positioned to remotely detect said detectable edge shadow without contacting said outside sheet or said stack; said optical detection system providing location information for the location of said edge shadow so as to provide location information for said sheet edge of said outside sheet of said stack.

Further specific features disclosed herein, individually or in combination, include those wherein said sheet stacking tray is part of a document sheet feeder for sequentially feeding said outer sheet from said stack by moving said outer sheet away from said stack to be imaged, and wherein said optical detection system is responsive only to a detected said sheet edge shadow which is detected as moving, so as to determine the size of the sheet being fed to be imaged relative to other sheets in said stack irrespective of different sizes of document sheets in said stack; and/or wherein said sheet stacking tray has an elongate aperture and said optical detection system is mounted to detect the movement of the trailing edge of the bottom sheet of a range of mixed sizes of plural document sheets stacked in said sheet stacking tray of said document sheet feeder to provide a control signal to said document sheet feeder indicative of the size of the document sheet being fed by said document sheet feeder; and/or wherein said sheet stacking tray is part of an output stacking system with a stacking tray in which thin printed sheets are sequentially stacked on top of other such sheets, and having an offsetting system for offsetting alternate stacks of sheets in said stacking tray, wherein said offsetting system is operatively controlled by said optical detection system sheet edge location information from a detected edge shadow of the top sheet in said stacking tray for controlling said offsetting of alternately printed stacks of sheets; and/or wherein said optical detection system is intermittently activated only in time periods in which said edge shadow detection is needed for said location information; and/or wherein said optical detection system comprises a low resolution photodetector array bar; and/or wherein said optical detection system comprises a low resolution photodetector array bar with an optical resolution of only approximately 3 mm or greater; and/or wherein said optical detection system is intermittently activated upon the actuation of said document sheet feeder for said document sheet being fed by said document sheet feeder.

The disclosed system may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs. Likewise, various possible useful control functions of copiers and printers provided with sheet sizes and/or positions information is well known in the art and patent literature and need not be repeated here.

In the description herein the term "sheet", "document" or "original" refers to a thin and usually flimsy physical sheet of paper, plastic, or other suitable physical substrate for images.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Figure 2:
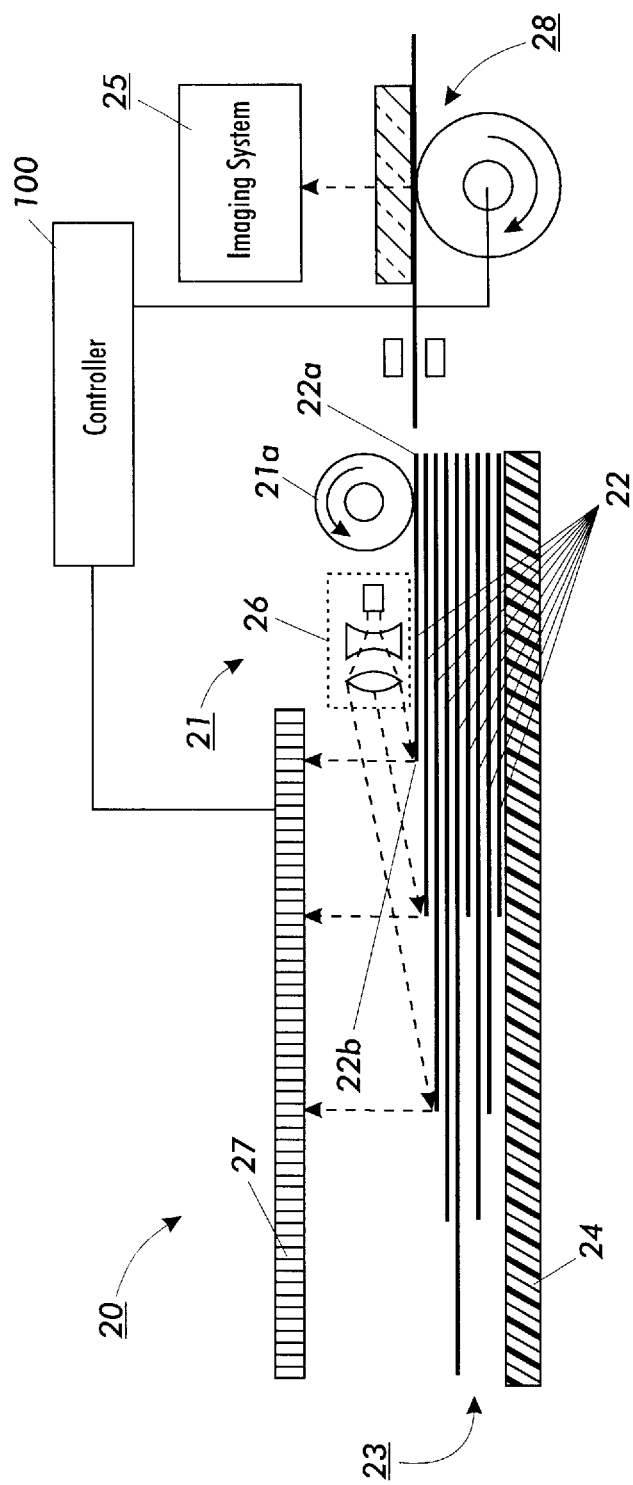

Various of the above-mentioned and further features and advantages will be apparent from the specific apparatus and its operation described in the examples below, including the drawing figures (approximately to scale) wherein:

FIG. 1 schematically illustrates in a side view a first embodiment of the subject sheet detection system in a document feeder with bottom sheet feeding and imaging;

FIG. 2 is a similar view and similar embodiment to that of FIG. 1, but illustrating a different embodiment with a top sheet feeding document handler; and FIG. 3 schematically illustrates a different sheet stack control system in which an output stacking tray has an offsetting system controlled by a slightly different form of the subject outermost sheet edge detection system using the detected sheet edge shadows of the top sheet on the output stack.

Referring first to the embodiment of FIG. 1, there is shown a sheet detection and control system 10 incorporated into an otherwise conventional bottom sheet feeding document handler 11 having a bottom feeder 11a for feeding document sheets 12 to be sequentially imaged in an imaging system 16 for local or remote printing. Here, the outside document 12a to be detected is the bottom sheet, since that is the sheet being fed in this FIG. 1 embodiment. As will be described, the dimensions of the bottom sheet 12a are detected here from the movement of its downstream and edge shadow 12b, even though there is, as shown here, a stack 13 of document sheets 12 of various different dimensions, all intermixed in the superposed stack 13. Here, this intermixed sizes set 13 of original documents 12 can be simply stacked into the same document handler 11 tray 14. The tray 14 here differs from a conventional document tray in that there is an elongated aperture 15 in the tray, as will be described.

It is particularly desirable to determine the size of the document 12a which is about the be imaged in the imaging system 16. For example, as described in the above-cited references, it may be desirable to change the document transport velocity by changing the speed of the constant speed transport roller 19 in the imaging system 16, and/or change the associated electronic scanning or buffering system, for magnification or reduction of the document in accordance with its size, or to make other adjustments in the document handler 11 or associated imaging or printing systems based on such control information. Schematically illustrated here is a controller 100, by way of example.

To this end, there is provided in FIG. 1 an upstream stack edges illumination system 17 for directing light at the various possible positions of the edges of the document sheets 12 to be detected. Here, this is accomplished by shining the light from the illumination system 17 up through the aperture 15 in the tray 14, as shown. The illumination system 17 is schematically illustrated here in one example as an LED and associated focusing lenses. Various other light sources, lenses and/or reflectors may be utilized. The illuminated area is large enough to include the various possible positions of the various size and position sheet edges to be detected. This illumination is directed at an angle, as shown, to produce strong sheet edge shadows. The (outside) sheet to be detected is illuminated over an area thereof on both sides of the sheet edge to be detected. It is important that the illumination be at an angle substantially above a grazing angle to the outermost sheet surface such as not to form shadows from surface irregularities of the outermost sheet and to only form a detectable shadow from the edge of the outer sheet.

As may be seen in the FIG. 1 example, there is an intermixed set 13 of different size documents 12 which will generate more than one edge shadow. However, the size of the sheet being fed can be detected from detection of the one of these edge shadows 12b which is moving, since that is the edge shadow of the sheet being fed to be imaged. Thus, an edge shadow detection system 18 is provided here which optically detects the various edge shadows, but electronically filters out all but the moving edge shadows in a known manner, such as by a low cut off or threshold filter for detecting changing vs. fixed pixel signals, with or without a buffer. Likewise, the detection of shadow movement can be templated within a range in a speed detection register based on the feeding speed of the sheet feeder from the tray. The detector itself may be a simple, conventional scanning array bar with multiple photodetecters, such as are commonly commercially available. It may be of relatively low resolution, e.g. as low as 3 mm per pixel, and thus lower cost, for the purposes here, since only the approximate position of the edge shadow needs to be detected. That is, the edge shadow detection system 18 does not have to be an imaging quality scanning array. It need only roughly detect the contrast between the light reflected from the outer surface of the document 12a relative to the absence of light in the shadow 12b formed at the edge of that sheet being detected. The movement of the shadow between the photodetecter elements of the array 18 may be conventionally electronically detected easily by the connecting controller 100. That controller 100 can then be connected to the imaging system 16 and/or its transport 19, or other portions of the document handler 11 to be controlled for the control functions described above, or otherwise. E.g., to change the selection of copy sheets onto which the image of that document 12*a* will be printed, and/or the printed image size, in a connecting or integral printer, as is well known per se.

Referring to FIG. 2, the description and advantages described above in connection with FIG. 1 are applicable here also and need not be re-described here. This system 20 of FIG. 2 is for a document handler 21 which feeds document sheets 22 from the top thereof with a top feeder 21*a* and therefore the outside document 22*a* here is the top sheet being fed from the top of the stack 23 in the tray 24 to the imaging system 25 for imaging thereof. Thus, here the angled illumination source of the stack edge of illumination system 26 is above the stack 23 rather than below the stack and tray as in the FIG. 1 embodiment. The imaging system 25 schematically illustrated here is the same as that of the imaging system 16 of FIG. 1. The edge shadow detection system, array 27 here in the FIG. 2 embodiment is likewise above the tray 24 to detect the stack edge shadows generated by the illumination system 26, and similarly connected to the DH controller 100 to detect the one detected edge shadow which is moving since that is the top sheet being fed to the imaging system 25 here.

As schematically shown in both FIGS. 1 and 2, the sheet being fed may also be fed past a width sensor interposed between the stack feeder and the imaging system, if desired.

In both the FIG. 1 and FIG. 2 embodiments, when an original such as 12*a* is being fed, its trail edge moves, and therefore its trail edge shadow 12*b* moves. This initially indicates the position and therefor the size of the outermost original in the stack being imaged, assuming, as is often the case, that the lead edges of the documents are, as shown, aligned with a front wall or area of the document tray 14. However, even if not, since, as described in the art cited above, the lead edge of that same document sheet will be detected by another sensor in the document feeding path shortly after it is initially fed, the length of the original is also easily calculated by the distance between the trail edge shadow position and that downstream sensor when the lead edge reaches that sensor. This measurement position can be, as desired, well before any part of the original reaches the transport 19 of the imaging system 16, and well before the trail edge of the document leaves the stack 13 or the stack feeder 11*a*, and does not require a long feeding path (the importance of which s described in the above-cited U.S. Pat. No. 5,596,399). It will also be appreciated that by simply counting the pixel to pixel movement in the detector array as the sheet 12*a* is being fed out that a sheet lead edge detector may not even be necessary for the sheet length determination.

Also, in either of the subject embodiments of FIGS. 1 and 2, the detection of the sheet edge position is not critical. As described in the above and other references, once the approximate length, to within, e.g., 3 mm, is known for the sheet, that approximate dimension may be compared in the controller to a look-up table to determine the nearest standard sheet dimension, e.g., in the U.S., 5", 8", 11", 14" and 17".

If desired, to compensate for the potential for color or dark areas of preprinted paper having an image side facing the optical detection array, the edge detection sensitivity threshold level can be adjusted or filtered to retain or detect only the contrast ratio provided by the light observed from the edge shadow area versus the adjacent document surface.

Various other such electronic and optical techniques and alternatives will be apparent to those skilled in the art, and need not be described in the examples herein.

Turning now to the FIG. 3 embodiment, instead of a document handling system, this sheet stack control system 30 is utilizing a similar document edge shadow detection system for detecting at least one edge of a top sheet 31*a* of a stack of sheets 31 in an output stacking tray 32, here an elevator type stacking tray which moves down as the sheets are sequentially outputted thereon automatically, as is well known in the art. With such an elevator type output stacking tray 32, the vertical position of the top sheet 31*a* is maintained relatively constant. However, it will be appreciated that the system 30 is not limited thereto, and that a vertical lamp array illumination system or the like could be utilized for overcoming or compensating the stack level changes in output stacking.

In this FIG. 3 system 30, there is a sets offsetting system 33 which is controlled by the detection of a position of an edge shadow of the top sheet 31*a*. The offsetting system 33 offset mechanism and drive per se may be conventional, as described above, and are shown schematically. Edge shadow detection is shown here for both side edges of the top sheet 31*a*, with two separate stack edge illumination systems, 34 and 35. A first or left side stack edge illumination system 34 projects a beam of light at an angle from that side of the stack 31 and the second illumination system 35 projects an angled beam of light from the opposite side of the stack. This creates edge shadows on both edges of the top sheet 31*a*, irrespective of its offset position. Although a single illumination and edge shadow detection system could be provided, there is illustrated here a system with two separate first and second edge shadow detection systems 36 and 37, each positioned over opposite sides of the stack 31 to detect the edge shadow generated by the lamp illumination systems 34 and 35 projecting from the opposite side of the stack, as shown. Both detectors 36 and 37 may have small, low resolution, arrays, here with a focusing lens allowing even a smaller array than discussed above. Both detectors 36 and 37 are connected to an offset system controller 38 here. This controller 38 detects the lateral offset position of the top sheet 31 irrespective of whether or not that was the last sheet offset or whether that offset position had been changed or moved, such as by an operator removing previous offset sets from the tray 32 which disrupted the offsetting. Knowing from the edge shadow detection system where the last or top sheet 31 is positioned, the controller 38 can simply direct the offsetting system 33 to laterally transpose the output or the stacking tray 32 in a known manner so that the next outputted sheets will either be aligned therewith, if it is the continuation of a job set, or if a new job set is being outputted, to operate the offsetting system 33 so that the next job set will stack offset therefrom, as shown. As noted above, offsetting and offsetting systems per se are well known in the above-cited and other art and need not be described herein.

Thus, with the system 30, offsetting need not be blindly based upon a preset programmed right/left/right/left movement, but rather may be based on which way the last outputted sheet is actually offset, so that the opposite offset can be used for the subsequent sheets even if the top job had been removed, or the machine operation interrupted or the like. Thus, proper offsetting can be maintained.

Note that for all of the above embodiments, that the illumination sources need not be left on continuously. They can be turned on momentarily when it is desired to detect a sheet edge position. Also, the illumination can be non-visible light, such as IR, and/or high frequency intermittent illumination to enable frequency filtered or synchronous detection, in order to further eliminate noise or false signals from extraneous light sources.

An added feature can provide better detection of the last sheet to be fed from the document feeding tray in the embodiments of FIGS. 1 or 2, if that is to also be done by edge shadow detection, as opposed the usual tray empty sensor, or otherwise. In FIG. 1, a top cover may be provided over the tray 14 in the illuminated area with an inside surface with a matte finish. In FIG. 2, likewise the upper surface of the tray 24 may have a matte finish. The matte finish could be black, or even white, to provide optical contrast with the edge shadow of the last sheet be detected by edge shadows. The last sheet may then be detected like all other sheets here. A moving shadow would be created at the trail edge of the sheet and detected by the sensor. In FIG. 2, with the tray 14 bottom surface painted a matte white, it will appear to the sensor like another overlying sheet. Either a single remaining long sheet, or a long sheet anywhere in a stack, would cast a shadow against this painted surface at its trail edge which could be detected as a moving black area.

Furthermore, as to the FIG. 2 embodiment, another detection algorithm could utilize the signals from the plural detector array elements upstream from the shadow of the moving edge to be detected, extending to the right hand end of the array, to capture a much larger reflection profile from the fed sheet, and then to deduce the moving edge position not only from the edge shadow itself but also from the left-most part or "edge" of the moving reflection pattern. This increases reliability of the edge detection in the case of sheets of darker paper and/or covered with dark edge image framing or other dark area, such as from a copy of an oversized text. I.e., to analyze detector array signals from more than just the area where the edge shadow is detected.

While the embodiments disclosed herein are preferred, it will be appreciated from this teaching that various alternatives, modifications, variations or improvements therein may be made by those skilled in the art, which are intended to be encompassed by the following claims.

What is claimed is:

1. A non-contact optical sheet size or position detection system for a sheet stacking tray in which thin document sheets of different sizes or positions are stacked on top of one another; said sheet detection system detecting the position of at least one sheet edge of an outside (top or bottom) sheet of said stack, comprising:

an illumination source for illuminating for light reflection therefrom an area of the surface of said outside sheet of said stack, said illuminated area including at least said one sheet edge, said illumination from said illumination source being at a sufficiently shallow illumination angle to the surface of said outside sheet to generate a detectable edge shadow directly adjacent to said sheet edge, which edge shadow is relatively darker than reflected said illumination of said top sheet adjacent thereto, said illumination angle being substantially greater than a grazing angle to not form shadows from said surface of said sheet, and an optical detection system positioned to remotely detect said detectable edge shadow without contacting said outside sheet or said stack, said optical detection system providing location information for the location of said edge shadow so as to provide location information for said sheet edge of said outside sheet of said stack, wherein said sheet stacking tray is part of a document sheet feeder for sequentially feeding said outer sheet from said stack by moving said outer sheet away from said stack to be imaged, and wherein said optical detection system is responsive only to a detected said sheet edge shadow which is detected as moving, so as to determine the size of the sheet being fed to be imaged relative to other sheets in said stack irrespective of different sizes of document sheets in said stack.

2. The sheet detection system of claim 1, wherein said sheet stacking tray has an elongate aperture and said optical detection system is mounted to detect the movement of the trailing edge of the bottom sheet of a range of mixed sizes of plural document sheets stacked in said sheet stacking tray of said document sheet feeder to provide a control signal to said document sheet feeder indicative of the size of the document sheet being fed by said document sheet feeder.

3. A non-contact optical sheet size or position detection system for a sheet stacking tray in which thin document sheets of different sizes or positions are stacked on top of one another, said sheet detection system detecting the position of at least one sheet edge of an outside (top or bottom) sheet of said stack, comprising:

an illumination source for illuminating for light reflection therefrom an area of the surface of said outside sheet of said stack, said illuminated area including at least said one sheet edge, said illumination from said illumination source being at a sufficiently shallow illumination angle to the surface of said outside sheet to generate a detectable edge shadow directly adjacent to said sheet edge, which edge shadow is relatively darker than reflected said illumination of said top sheet adjacent thereto, said illumination angle being substantially greater than a grazing angle to not form shadows from said surface of said sheet, and an optical detection system positioned to remotely detect said detectable edge shadow without contacting said outside sheet or said stack, said optical detection system providing location information for the location of said edge shadow so as to provide location information for said sheet edge of said outside sheet of said stack, wherein said sheet stacking tray is part of an output stacking system with a stacking tray in which thin printed sheets are sequentially stacked on top of other such sheets, and having an offsetting system for offsetting alternate stocks of sheets in said stacking tray, wherein said offsetting system is operatively controlled by said optical detection system sheet edge location information from a detected edge shadow of the top sheet in said stacking tray for controlling said offsetting of alternately printed stacks of sheets.

4. The sheet detection system of claim 1, wherein said optical detection system is intermittently activated only in time periods in which said edge shadow detection is needed for said location information.

5. The sheet detection system of claim 1, wherein said optical detection system comprises a low resolution photodetector array bar.

6. The sheet detection system of claim 1, wherein said optical detection system comprises a low resolution photodetector array bar with an optical resolution of only approximately 3 mm or greater.

7. The sheet detection system of claim 1, wherein said optical detection system is intermittently activated upon the actuation of said document sheet feeder for said document sheet being fed by said document sheet feeder.

* * * * *